US012593130B2

(12) United States Patent
Brescianini et al.

(10) Patent No.: US 12,593,130 B2
(45) Date of Patent: Mar. 31, 2026

(54) TRACKING CAMERA, TRACKING CAMERA SYSTEMS, AND OPERATION THEREOF

(71) Applicant: Sony Group Corporation, Tokyo (JP)

(72) Inventors: Dario Brescianini, Stuttgart (DE); Peter Dürr, Stuttgart (DE); Markus Kamm, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/036,652

(22) PCT Filed: Nov. 8, 2021

(86) PCT No.: PCT/EP2021/080902
§ 371 (c)(1),
(2) Date: May 12, 2023

(87) PCT Pub. No.: WO2022/106233
PCT Pub. Date: May 27, 2022

(65) Prior Publication Data
US 2024/0015402 A1      Jan. 11, 2024

(30) Foreign Application Priority Data
Nov. 19, 2020      (EP) ..................................... 20208562

(51) Int. Cl.
*H04N 23/695* (2023.01)
*H04N 23/61* (2023.01)
(52) U.S. Cl.
CPC ........... *H04N 23/695* (2023.01); *H04N 23/61* (2023.01)

(58) Field of Classification Search
CPC ............................ H04N 23/695; H04N 23/61
USPC .......................................................... 348/169
See application file for complete search history.

(56) References Cited

U.S. PATENT DOCUMENTS

| | | | | |
|---|---|---|---|---|
| 5,090,797 A | * | 2/1992 | Cleveland | .............. A61B 3/113 |
| | | | | 359/872 |
| 5,410,376 A | * | 4/1995 | Cornsweet | ............. G06V 40/19 |
| | | | | 351/209 |
| 10,466,779 B1 | | 11/2019 | Liu | |
| 2010/0026809 A1 | | 2/2010 | Curry | |
| 2013/0120581 A1 | | 5/2013 | Daniels et al. | |
| 2018/0180733 A1 | | 6/2018 | Smits | |

(Continued)

FOREIGN PATENT DOCUMENTS

| | | |
|---|---|---|
| CN | 106527502 A | 3/2017 |
| CN | 111417983 A | 7/2020 |

(Continued)

OTHER PUBLICATIONS

International Search Report and Written Opinion mailed on May 3, 2022, received for PCT Application PCT/EP2021/080902, filed on Nov. 8, 2021, 19 pages.

(Continued)

*Primary Examiner* — Amir Shahnami
(74) *Attorney, Agent, or Firm* — XSENSUS LLP

(57) ABSTRACT
A tracking camera is disclosed, including a mirror assembly and event camera each communicatively coupled to a control unit. The control unit receives event data from the event camera and adjusts the mirror assembly based on the event data. A lens assembly includes at least one lens between the mirror assembly and the event camera.

20 Claims, 7 Drawing Sheets

(56) References Cited

U.S. PATENT DOCUMENTS

| | | | |
|---|---|---|---|
| 2019/0014258 A1 | 1/2019 | Horesh | |
| 2019/0302268 A1* | 10/2019 | Singer | G01S 17/34 |
| 2020/0249017 A1 | 8/2020 | Török et al. | |
| 2020/0249080 A1 | 8/2020 | Petty et al. | |
| 2020/0336637 A1 | 10/2020 | Koppal et al. | |
| 2020/0348755 A1 | 11/2020 | Gebauer et al. | |
| 2021/0068652 A1* | 3/2021 | Nistico | A61B 3/113 |

FOREIGN PATENT DOCUMENTS

| | | |
|---|---|---|
| CN | 111521161 A | 8/2020 |
| CN | 111656256 A | 9/2020 |
| GB | 2595909 A | 12/2021 |
| JP | 2018028678 A | 2/2018 |
| WO | 2001041884 A1 | 6/2001 |

OTHER PUBLICATIONS

Saner et al., "High-Speed Object Tracking Using an Asynchronous Temporal Contrast Sensor", Vision, Modeling, and Visualization, 2014, 8 pages.

Diginfo TV, "Dynamic target tracking camera system keeps its eye on the ball", Robohub, 5 pages.

Cambridge Technology https://web.archive.org/web/20200920172051/ https://www.cambridgetechnology.com/products/galvanometer-scanner Sep. 20, 2020.

Gallego, Guillermo et al., Event-based Vision: A Survey https://arxiv.org/pdf/1904.08405 Aug. 8, 2028.

Hawkeye Innovations, Ball Tracking https://web.archive.org/web/20191020143841/https://www.hawkeyeinnovationscom/ Oct. 20, 2019.

Okumura, Kohei et al. High-speed Gaze Controller for Millisecond-order Pan/tilt Camera 2011 IEEE International Conference on Robotics and Automation Shanghai International Con.

* cited by examiner

600

610

620

630

415

700

790

730

710        712

760

750

TRACKING CAMERA, TRACKING CAMERA SYSTEMS, AND OPERATION THEREOF

CROSS-REFERENCE TO RELATED APPLICATIONS

This application is based on PCT filing PCT/EP2021/080902, filed Nov. 8, 2021, which claims priority to European patent application EP20208562.7, filed Nov. 19, 2020, entitled "Tracking Camera, Tracking Camera Systems, And Operation Thereof," the contents of each of which are incorporated by reference in their entirety herein.

FIELD

The present disclosure relates to optical imaging devices, particularly cameras and camera assemblies for tracking objects. Examples relate to a method and an apparatus for tracking objects.

BACKGROUND

Cameras can be used to record optical images, including moving objects. A tracking camera may record optical images, and may also track the movement of an object in space. A ball tracking system, such as a ball tracking camera may be used in sports such as tennis and golf, for example, and may track a ball's movement in space. Tracking moving objects with a vision sensor such as a camera presents many technical challenges, such as with respect to having adequate responsivity of the tracking system/method and optical resolution. It may be desirable to design tracking devices and methods to enable tracking of rapidly moving/accelerating objects, particularly small and/or low optical contrast objects, as well as to improve optical images obtained with tracking cameras.

SUMMARY

In view of the technical challenges in designing tracking devices and methods that can track rapidly moving or accelerating objects, herein is disclosed a tracking camera as defined in appended independent claim 1. Further advantages are provided by the subject matter defined in the dependent claims.

A tracking camera is disclosed herein, including a mirror assembly and an event camera each communicatively coupled to a control unit. The control unit receives event data from the event camera, and adjusts the mirror assembly based on the event data. Tracking systems are disclosed herein which include the tracking camera.

A method of operating a tracking camera is disclosed herein, including receiving event data from an event camera, determining an adjustment signal based on the event data, transmitting the adjustment signal to a mirror assembly, and adjusting the mirror assembly according to the adjustment signal. A non-transitory computer-readable medium computer program is disclosed, having a program code for, when executed on a processor, causing the execution of the method.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. The figures are not necessarily to scale.

Figure 1:
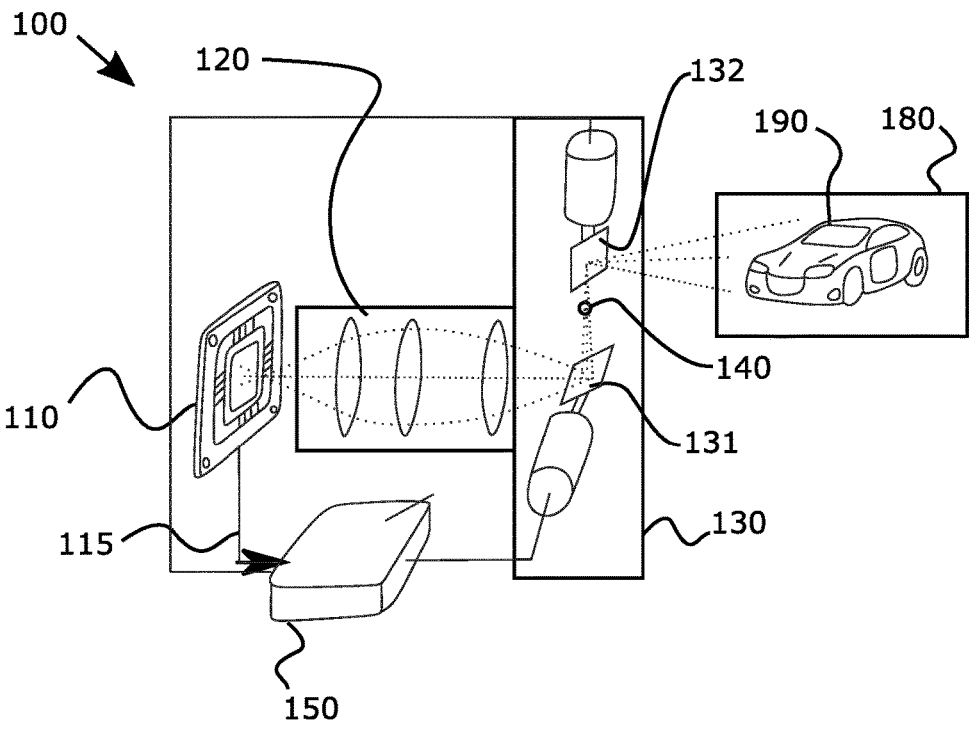
FIG. 1 illustrates a tracking camera, according to embodiments described herein.

FIG. 1 illustrates a tracking camera 100, according to embodiments described herein, including those illustrated in other figures. The tracking camera 100 may track a tracked object 190 such as a fast moving object like a car or ball. The tracking camera 100 includes a mirror assembly 130 and an event camera 110, each communicatively coupled to a control unit 150. The control unit 150 receives event data 115 from the event camera 110, and adjusts the mirror assembly 130 based on the event data 115. The event camera 110 may be capable of rapidly providing event data 115 to the processor 150, such that the responsivity of the tracking camera 100 is improved, particularly in comparison to a conventional/frame camera. The rate of communication of event data 115, particularly asynchronous event data, to the control unit 150 by the event camera 110 may exceed the possible frame rate of a conventional camera, which may be advantageous for tracking the tracked object 190. Event cameras may have temporal resolution in hundreds of microseconds or even less, which may greatly exceed the temporal resolution of convention/frame cameras. The tracking camera 100 as described herein may allow for recording images, measuring trajectories, angular velocities, object rotations, vibrations, and combinations thereof.

The mirror assembly 130 of the tracking camera 100 may direct light from the tracked object 190 to the event camera 110. The event camera 110 can optionally be stationarily mounted to the frame of the tracking camera 100.

An event camera 110 may offer one or more advantages over conventional/frame cameras, such a reducing the amount of data for processing by the control unit 150. A tracked object 190 may cover only a small portion of an image frame of a conventional/frame camera. This may cause a conventional/frame camera to image a tracked object 190 with poor resolution, since much of the image frame may be taken up by background. Thus, much of the image frame data from a conventional camera may need to be filtered/ignored by a tracking algorithm. A conventional/frame camera, by transmitting an entire image frame multiple times per second, may burden the tracking algorithm with enormous amounts of data to filter/ignore.

The control unit 150 of the tracking camera 100 may be a circuit, a computing device, a CPU, a programmable field array, or the like. The control unit 150 may be programmed to perform part or all of the methods described herein, such as determining a mirror adjustment for a mirror assembly 130 based on event data 115 from the event camera 110, particularly so as to enable tracking of a tracked object 190.

Utilizing an event camera 110 may improve tracking, e.g. by providing more relevant data to the control unit 150 for determining the position of the tracking object 190. Efficient use of computational power may also aid in rapidly and accurately determining optical, mechanical, and/or digital adjustments for tracking the tracked object 190, and may reduce power requirements.

The event camera 110 can transmit event data 115 to the control unit 150 which is also communicatively coupled to the mirror assembly 130. The event data 115 may include at least one event datum which may include a pixel x-position, a pixel y-position, a polarity, and a time stamp. The event data 115 may be generated asynchronously. Each individual asynchronous event can generate a set of event data that includes at least one of: pixel x-position, pixel y-position, polarity, a time stamp, and any combination thereof. The term "event data" may refer to a plurality of sets of event data, e.g. each set thereof produced from a respective individual (asynchronous) event. Each individual asynchronous event may be time stamped. For example, event data 115 corresponding to a single event includes a polarity which indicates whether the event is in response to an increase or decrease in intensity; the event data also including the pixel position, x, y, of the event and a time stamp.

In an embodiment, the mirror assembly 130 has at least one actuatable mirror 131. The actuatable mirror(s) 131, 132 may be a galvanometer mirror(s). It is envisioned that the response time of the actuatable mirror(s) can be less than 500 s, 300 s, 200 s, or 100 s for movements of up to 0.5° or 0.2°, or 0.1°. Rapidly responsive mirrors may allow for faster tracking. Particularly, in comparison to movement of the body 111 of the tracking camera, e.g. using a pan/tilt mechanism, movable mirrors for tracking motion may allow faster response times. Other types of mirrors for the actuatable mirror(s) 131, 132 are contemplated, such as micro-electromechanical (system) mirrors (MEMs mirrors) and piezoelectric mirrors (PZ mirrors). Furthermore, low-mass mirrors may also lead to improving responsivity, by having lower inertia, and therefore faster response. Optionally, the maximum diameter of at least one of the actuatable mirror(s) is 0.25 cm, 0.5 cm, 1 cm, 1.5 cm or 2.5 cm. Micromirrors may also be possible.

Rapidly moving mirrors, e.g. having high bandwidth, short settling time, and/or low latency, may work synergistically with the event camera 110, e.g. having excellent temporal resolution and/or low latency, to provide for rapid tracking. For example, motion blur can be reduced. Each of the mirror assembly 130 and event camera 110, as described herein, particularly working in synergy, can allow for accurate/rapid bearing information of the tracked object 190.

In an embodiment, the tracking includes a lens assembly 120 which includes at least one lens between the mirror assembly 130 and the event camera 110. At least one of the lens(es) of the lens assembly 120 may be stationarily mounted relative to the body 111 of the tracking camera. The body 111 of the tracking camera 100 may hold the event camera 110, lens assembly 120, and mirror assembly 130, and optionally the control unit 160. Fixed lenses may provide mechanical stability. A lens assembly 120 that includes a liquid lens is also contemplated, which may allow for rapid adjustment of focus. An autofocus mechanism is further contemplated, e.g. an event-based autofocus.

Figure 2:
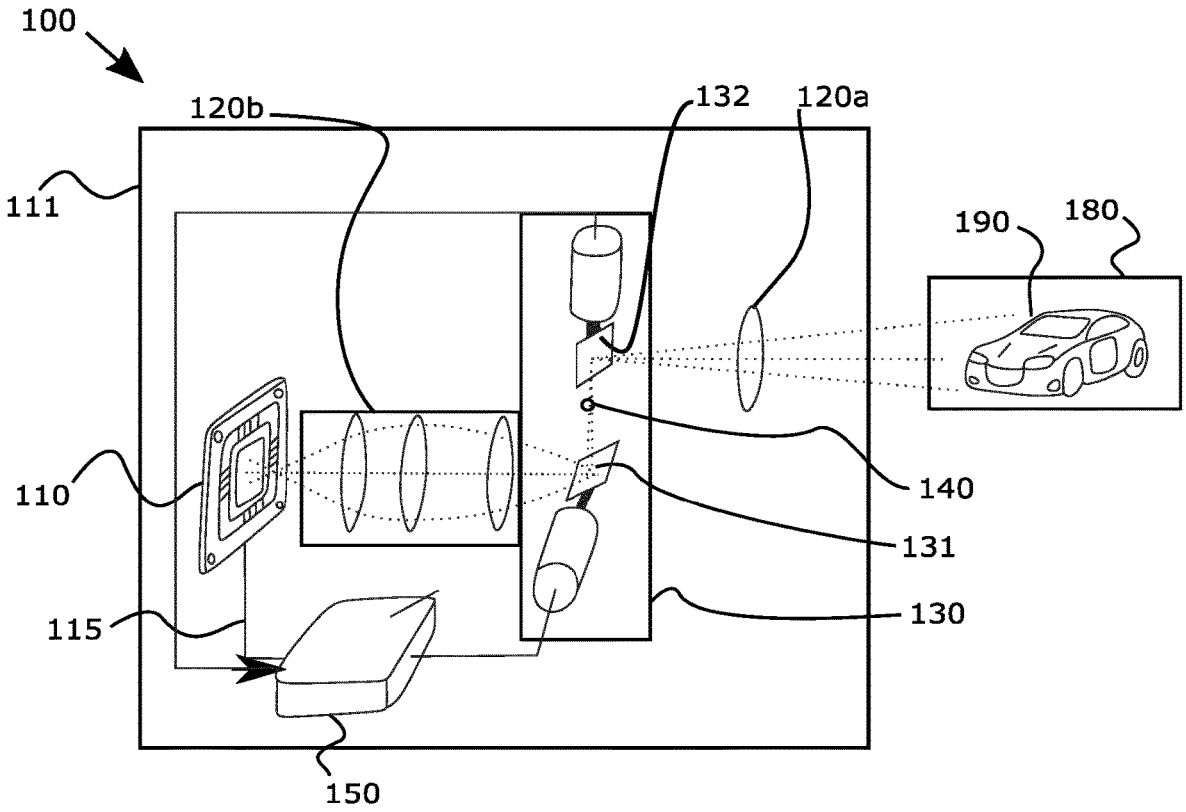
FIG. 2 illustrates a tracking camera, according to embodiments described herein.

In an embodiment, a pupil position 140 is close to or within the mirror assembly 130. This can increase the dynamic range of the tracking device. Some pupil positions 140 may provide for a large change in direction of the field of view with small mirror movements, particularly when the pupil position 140 not in front of the lens assembly 120. It may be possible to improve the time resolution of the tracking camera by placing a pupil position 140 close to or within the mirror assembly 130, such as between a pair of mirrors 131, 132 of the mirror assembly 130, as illustrated in FIG. 2. As noted above, smaller mirror movements may be executed more quickly/accurately than large mirror movements. It can be advantageous to have small accurate mirror movements be able to effect a significant change in the direction of the field of view and/or optical axis. In addition, the mirrors can be smaller, when they are placed close to the pupil position.

In an embodiment, an aperture, such as a variable aperture, may be placed at the pupil position 140, such as within the mirror assembly 130, and/or between a pair of mirrors 131, 132 of the mirror assembly 130.

It is particularly contemplated to place the mirrors 131, 132 of the mirror assembly 130 (or the only mirror in the case of a single mirror) at the pupil position 140 of the lens assembly 120. Alternatively/additionally, the pupil position 140 can be within 2 cm, 1 cm, 5 mm, or 1 mm of the mirror assembly 130, and/or a mirror 131, 132 of the mirror assembly 130. The response time, resolution, and/or dynamic range of the tracking camera 100 can be enhanced.

In an embodiment, the lens assembly 120 may have a focal length of at least 70 mm, 100 mm, 120 mm, 150 mm, or 200 mm, for example, particularly when the event camera is near the size of a full format sensor, e.g. a 35 mm "full frame" sensor; the focal length may be 4-10 mm such as when the event camera is smaller, such as near the size of a mobile phone camera sensor, e.g. around 1 cm across. A telephoto lens, for example, may give a narrower field of view and greater magnification (relative to a shorter focal length lens assembly), thus allowing the image of the tracked object 190 to better fill the event camera 110 for better resolution.

In an embodiment that may be combined with any other embodiments described herein, a lens assembly 120 which has a large aperture and long focal length may provide a shallow depth of field. A combination of optics, particularly the lens configuration of the lens assembly 120, the pupil position 140, and pupil size, may be such that the tracked object is in focus while its environment is unfocused. The shallow depth of field of such a combination of optics may allow the distance to the tracked object 190 to be more easily determined. When the depth of field is shallow, and the object is in focus (such as by autofocus), the distance to the object (z) can be more precisely determined. The x, y coordinates of the object can be determined based on the event data 115. The focus of the object can be used to determine z. It is possible to determine 3D bearing information to be determined from the tracking camera 100, such as the tracking camera 100 alone, without additional cameras, particularly when focus is used to determine z position.

A shallow depth of field may also effectively isolate the tracked object 190 from foreground and background. This may simplify the data generated by the event camera 110, for example, by evening out the statistics of events occurring in the foreground/background. For example, the shallow depth of field may allow the foreground/background events to appear to be a uniform background noise. The signal of events (e.g. a subset of the event data 115), those associated with the tracked object 190, may be more easily identified by their higher contrast to the foreground/background events, which may be more evenly distributed in the remainder of the event data 115 when the depth of field is shallow, e.g. when the environment of the tracked object is defocused.

FIG. 2 illustrates a tracking camera 100, according to embodiments described herein, including those illustrated with other figures. The lens assembly 120 (e.g. 120*a*, 120*b*) can provide a focused image at the event camera 110. Various lens configurations/combinations are contemplated, including that of FIG. 2. As in each of FIG. 1 and FIG. 2, the lens assembly 120 can include a stack of lenses 120*b* between the mirror assembly 130 and the event camera 110. As in FIG. 2, the lens assembly 120 can include a collection lens 120*a* (e.g. a biconvex collection lens 120*a*) on the opposite side of the mirror assembly 130 to the event camera 110. Herein are disclosed lens configurations that, particularly in the embodiment of FIG. 2, are such that small angular displacements of the mirror(s) of the mirror assembly 130 can result in large angular displacements of the optical paths between the event camera and the (moving) tracked object. For example, smaller mirror movements may be executed more quickly/accurately than large ones, so that it is possible to improve the responsivity of the tracking camera. The lens configurations described herein can improve the temporal response (or responsiveness), of the tracking camera 100 and/or increase the dynamic range of the tracking camera 100, e.g. the range of object space (e.g. in steradians) that can be subject to tracking.

Figures 3, 4:
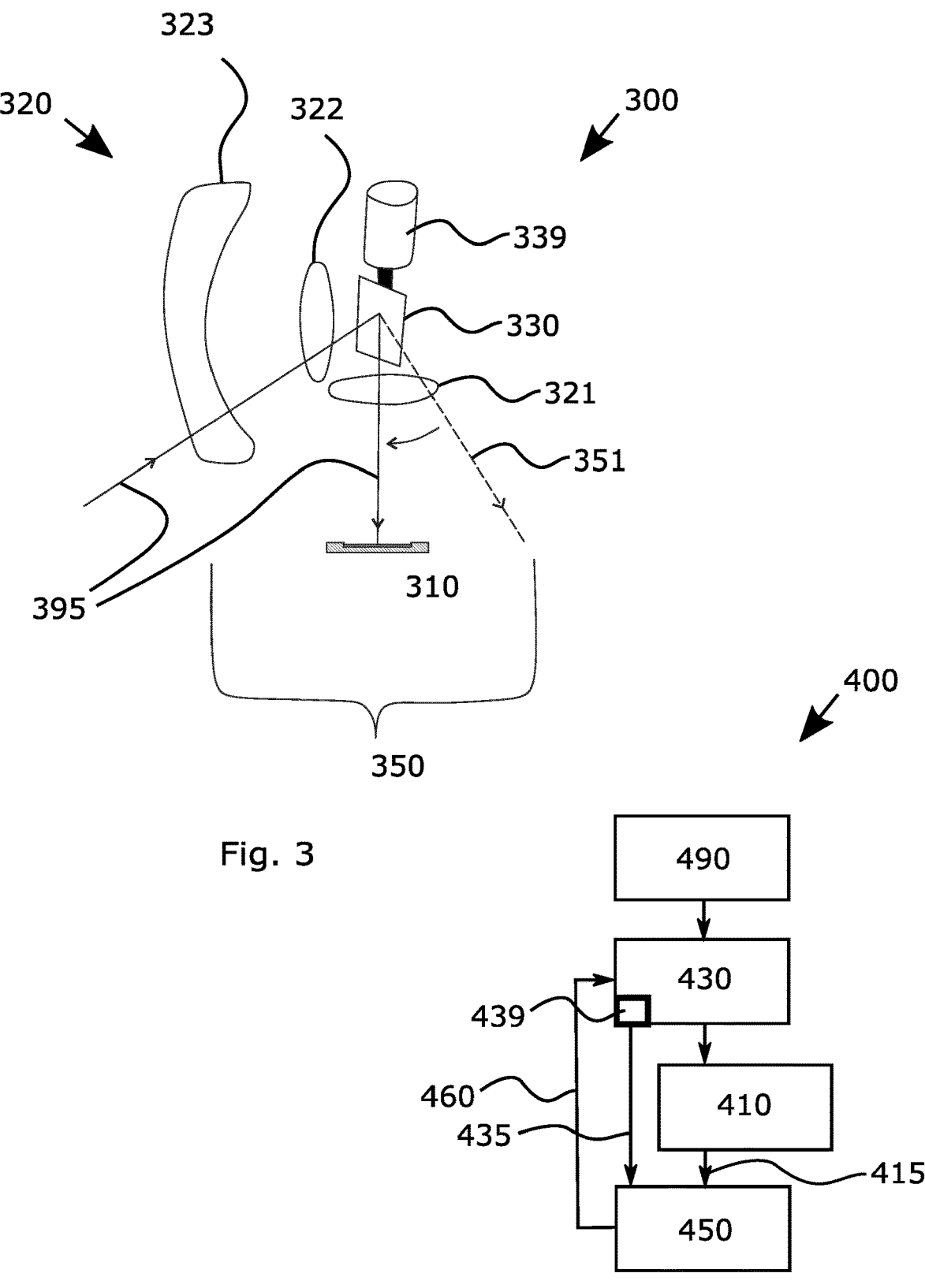
FIG. 3 shows a tracking camera, according to embodiments described herein.
FIG. 4 illustrates a block diagram of a system, method, or device for tracking, according to embodiments described herein.

FIG. 3 shows a tracking camera 300, according to embodiments described herein, including those illustrated with other figures. FIG. 3 illustrates a lens assembly 320 working in synergy with a mirror assembly 330 and an event camera 310. As illustrated in FIG. 3, the lens assembly 320 (including lenses 321, 322, and 323) can be designed as a wide-angle lens assembly with an image circle 350 significantly larger than the event camera 310; the area of the image may be larger than the field of view of the event camera 310. This can enhance the resolution of the tracked object 190, particularly when the tracked object can be tracked such that the image of the tracked object nearly fills the event camera 310. The mirror assembly 330 (of at least one movable mirror) can be moved to maintain a field of view of the event camera 310 that includes the tracked object 190. The mirror assembly 330 can be adjusted during tracking such that the tracked object's image is kept within the event camera 310 such as toward the center of the event camera 310.

As illustrated in FIG. 3, an optical path 395 from the tracked object 190 may reflect from a mirror of the mirror assembly 330 and be directed to a point of the event camera 310 such as the center. FIG. 3 also shows an edge ray 351

(dashes) to help illustrate the image circle 350. The image circle 350 may be the circle traced by the edge ray 351 rotated about the portion of the optical axis of the tracking camera 300 that extends in a straight line (in FIG. 3, "up" from the event camera 310), perpendicular to the image plane, aligned to be coplanar with the sensor plane of the event camera 310. FIG. 3 illustrates overfilling of the event camera 310 by the image circle 350 of the lens assembly 320.

An event camera 110, 310, particularly in comparison to a conventional/frame camera, may have larger pixels and/or lower pixel density. The inventors have recognized that it is possible to compensate for the often smaller pixel density of typical event cameras by utilizing a smaller field of view (e.g. a smaller viewing angle), which may improve optical resolution of the tracked object 190. In the configuration shown in FIG. 3, the image circle 350 overfills the event camera 310 at the image plane. Compensation by overfilling the event camera 310 at the image plane is possible to improve the image resolution of the tracked object 190. The lens assembly 320 may include a lens 321 (e.g. a biconvex lens) between the event camera 310 and the mirror assembly 330, a second lens 322 (e.g. a biconvex lens) on the opposite side of the mirror assembly 330 from the event camera 310, and a third lens 323 (e.g. a negative meniscus lens) on the opposite side of the second lens 322 from the mirror assembly 330.

It is to be appreciated, as is apparent from the descriptions herein, that the lens configuration of the lens assembly 120, 320 may work synergistically with the mirror assembly 130, 330, as disclosed herein, to provide for better optical resolution of the tracked object 190 while providing faster response time. The event camera 110, 310 may also work similarly synergistically with the lens assembly 120, 320 and/or mirror assembly 130, 330, particularly for improving the responsivity.

FIG. 4 illustrates a block diagram of a system, method, or device for tracking 400, according to embodiments described herein which may be combined with other embodiments described herein, particularly those illustrated in any of the other accompanying figures. An object of interest 490 can be in a line of sight and/or field of view of the tracking camera, particularly the event camera 410 thereof and/or mirror assembly 430 thereof. The mirror assembly 430 may direct light to the event camera 410.

The control unit 450 can accumulate/receive event data 415 from the event camera 410. The control unit 450 can determine the adjustment signal 460 based on the event data 415 and can transmit the adjustment signal 460 to the mirror assembly 430 for adjusting the mirror assembly 430. The mirror assembly 430 may be adjusted such that the tracked object 190 is kept within a line of sight of the event camera 410, e.g. such that the image of the tracked object 190 overlaps and/or is within the event camera 410, such as centered in the event camera 410.

The control unit 450 may receive/accumulate, for a time interval, event data 415. The event data 415 can be used by the control unit 450 to determine adjustment signal 460. The control unit 450 may estimate a bearing array (x, x', x", t) based on the event data 415. The bearing array (x, x', x", t) may correspond to the tracked object 190, such as a position (x, y) thereof. (Here, x may be a 1, 2, or even 3 dimensional position; and x' and x" may be 1, 2, or 3 dimensional velocities and accelerations, respectively). The bearing array may also include velocity or speed information (e.g. x', y', |x'+y'|), and may alternatively/additionally include acceleration information (x"). The adjustment signal 460 may be based on the bearing array (x, x', x", t).

The bearing array optionally includes at least one element in regard to a time, which may correspond to a previous time, current, or future time. For example, the bearing array has elements corresponding to an instant coordinate (x, y, and possibly z) of the tracked object, and a time of the corresponding instant/event. In another example, the bearing array has elements corresponding to a determined average position (e.g. x, y, and possibly z), and average time of a plurality of events used to determine the corresponding average position.

It is conceivable that the bearing array is determined by the control unit 450 for a projected position of the tracked object 190 at a future time, t, e.g. a future time when the mirror assembly 430 is moved to the position encoded with the adjustment signal 460. Such a determination may take into account the amount of time it takes to adjust the mirror assembly 430, because of finite response times of the mirror(s) of the mirror assembly (430).

Alternatively/additionally, the bearing array may include at least one element with a time corresponding to a previous time. The bearing array can possibly include at least one copy of part of an event data (e.g. x, y, t).

For example, the control unit 450 may (i) accumulate event data 415 for a time interval, then (ii) determine a common time within the time interval, and (iii) estimate a bearing array element (x, x', x", t) at the common time, based on the accumulated event data 415. The control unit 450 may determine the adjustment signal 460 based on the bearing array element (x, x', x", $t_c$) at the common time, $t_c$, or some other time $t_0$, particularly after the common time. The time $t_0$ may correspond to the time at which the mirror(s) is expected to reach the new position after the adjustment signal 460 is transmitted. The time, to, may be the time at which the adjustment signal 460 is transmitted and/or the event data 415 is received by the control unit 450, which may be useful for situations in which the mirror(s) adjustment is sufficiently rapid compared to motion of the tracked object 190.

The steps (i), (ii), and (iii) described above may be executed, and then (iv) an adjustment of the mirror assembly can be made; and the steps i-iv can be repeated over a subsequent time interval. Repeating the steps can be done to track the object.

The bearing array may be used to determine the trajectory of the tracked object 190, for example. Alternatively/additionally, the bearing array may be used to determine the adjustment signal 460.

The control unit 450 may adjust an accumulated set of events from the event camera 410 so that the accumulated events have a common time, $t_c$. The common time $t_c$ may be useful for motion compensation, e.g. that occurring over the duration of the data accumulation. It is possible to synthesize an image frame at the common time $t_c$, such as by accumulating event data 415 (and/or the mirror positions, e.g. using a history of adjustment signals 460 or feedback signals from the mirror assembly).

In an embodiment, asynchronous event data 415 of the event camera 410 can be processed asynchronously, as the event data 415 is transmitted to the processor 450. For example, multiple estimates (e.g. the bearing array or bearing estimates) at different points in time might be combined probabilistically, e.g., using a recursive filter like an Extended Kalman Filter which may also include a model of the object's dynamics. A synchronous or an asynchronous method or control algorithm may be used to actuate the mirrors (e.g. determine the adjustment signal 460).

The actuation and/or adjustment signal 460 may be based on the difference of the estimated position of the object in the image coordinates (e.g. corresponding to the position elements of the bearing array element (such as x, y in the frame of reference of the event camera) and the center of the event camera 410. The actuation and/or adjustment signal 460 may be determined such that the object is (e.g. repeatedly) centered in the field of view of the event camera 410.

The control unit 450 may determine a bearing array (x, x', x") in any coordinate frame and/or any coordinate system. It may be particularly useful to utilize the frame of reference of the event camera 410, however, other coordinate frames may also be useful, particularly in tracking systems which use multiple cameras. The bearing array may include coordinates related to the orientation of the mirror(s) of the mirror assembly 430, such as a mirror orientation array (θ, φ, t).

The adjustment signal 460 may, alternatively/additionally, be based on the mirror orientation array (θ, φ, t) which may be an array of previous and/or desired/target orientations of the mirror(s) of the mirror assembly 430. The mirror orientation array (θ, φ, t), may be determined based on the event data based on event data 415, and/or other determinations such as the bearing array and/or feedback signals from the mirror assembly indicative of mirror positions.

Alternative/additional implementations of the control system may aim at extracting more information from the event camera 410 by generating a pattern of saccade movements around the tracked object 190. For example, the control unit 450 may determine a plurality of adjustment signals 460 which are sequentially transmitted to the mirror assembly 430.

According to embodiments described herein, the tracking camera may be controlled/operated by the control unit. The operation may include receiving event data from an event camera; determining an adjustment signal based on the event data; transmitting the adjustment signal to a mirror assembly; and adjusting the mirror assembly according to the adjustment signal. The operation of the tracking camera may also include collecting light and forming an image of a tracked object on the event camera. The collected light may pass through the lens assembly, including a pupil position near or within the mirror assembly (as explained herein).

The control unit 450 may estimate a bearing array (x, x', x", t) based on the event data 415. The bearing array (x, x', x", t) can correspond to a tracked object 190 (e.g. a position thereof). The adjustment signal can be determined based on the bearing array.

The communicative coupling between the control unit 450 and the mirror assembly 430 may be two-way. For example, the control unit 450 sends an adjustment signal 460 to the mirror assembly 430. Alternatively/additionally, the mirror assembly 430, and/or an orientation feedback system 439 (which may be part of the mirror assembly 430), sends a mirror assembly status 435 to the control unit 450. The mirror assembly status 435 may be a position/orientation signal such as data regarding the position(s) and/or orientation(s) of mirror(s) of the mirror assembly 430, such as the mirror orientation array (θ, Y, t) and/or data for the mirror orientation array (θ, y).

In an embodiment that may be combined with any other embodiment described herein, the tracking camera 400 includes an orientation feedback system 439 communicatively coupled to the control unit 150 for communicating a mirror assembly status, such as mirror position(s)/orientation(s), and/or mirror orientation array (0, y, t). The orientation feedback system 439 may communicate a mirror position/orientation for at least one mirror of the mirror assembly (up to possibly each mirror of the mirror assembly), and optionally includes time information such as a time stamp.

The orientation feedback system 439 may utilize capacitive sensing, for example. The orientation feedback system 439 may provide data to the control unit 450 which can be used to determine the position/direction of a tracked object 490, and/or the direction of the optical path leading into the tracking camera 400, and/or the position/direction of an irradiated spot of the field of view 480.

Figures 5, 6, 7:
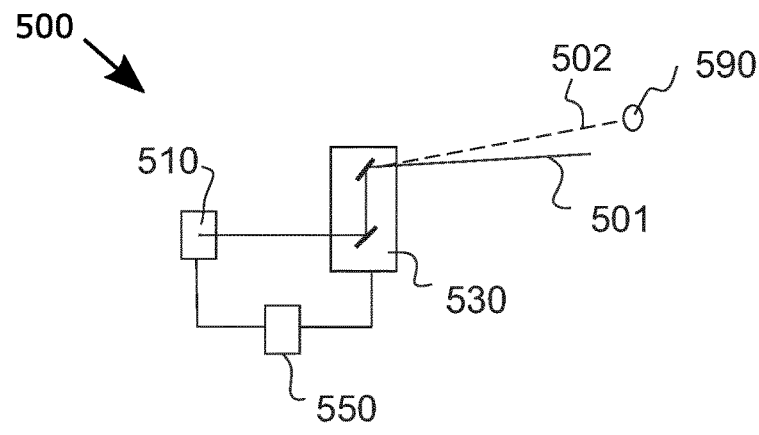
FIG. 5 illustrates a tracking camera, according to embodiments described herein.
FIG. 6 illustrates a method of initiation of tracking, according to embodiments described herein.
FIG. 7 illustrates a block diagram of a system, method, or device for tracking, according to embodiments described herein.

FIG. 5 illustrates a tracking camera 500, according to embodiments described herein. The embodiment of FIG. 5 can be combined with other embodiments described herein, including embodiments illustrated by other figures disclosed herein. The tracking camera 500 includes an event camera 510, mirror assembly 530, and control unit 550. The tracking camera 500 can have an optical axis 501 that extends out from the tracking camera 500 to the field of view. The optical axis 501, particularly the part external to the tracking camera 500 as shown in FIG. 5, is movable, based on movements of the mirror(s) of the mirror assembly 530. In an embodiment, when the mirror assembly 530 is adjusted, the optical axis 501 of the tracking camera 500 moves.

For example, the control unit 550 determines, or effectively determines, a target direction 502, and transmits the adjustment signal 460 such that the optical axis 501 moves toward the target direction 502. The target direction 502 may be directed at the target object 590. For example, the control unit 550 may transmit the adjustment signal 460 such that the optical axis 501 of the tracking camera 500 (which may extend to the center of the event camera 510) is moved to the target direction 502 (e.g. while extending also to the center of the event camera 510) based on the bearing array (x, x', x", t). Alternatively/additionally, the adjustment signal 460 can be based on the target direction 502, which may be determined based on the event data 415.

The target direction 502 may be effectively determined such that the target object 590 overlaps or is within the field of view of the event camera 510, such as centered therein. Alternatively/additionally, the control unit 550 may determine a plurality of target directions 502, such as in order to generate a pattern of saccade movements around the tracked object 590. For example, the control unit 550 may determine a plurality of adjustment signals 460, such as based in an accumulation of event data 415 (e.g. throughout a time interval). The plurality of adjustment signals 460, may be sequentially transmitted to the mirror assembly 530, such that the optical axis 501 moves sequentially to each of the plurality of target directions 502.

The plurality of target directions 502 and/or adjustment signals 460 may be such that the target object 590 overlaps or is within the field of view of the event camera 510 with each movement of the optical axis 501 to each target direction 502.

In an embodiment, the control unit 550 determines a plurality of target directions 502 and/or adjustment signals 460 asynchronously from the event data 415. The optical axis 501 is effectively moved away from the target object 590 such as intermittently away from the target object 590, e.g. around the target object 590. In an embodiment, the optical axis 501 is effectively moved alternately away from the target object 590 and toward the target object 590. Such movements may allow environmental data to also be taken into account for environmental effects on the movement of the tracked object 590 (such as anticipated collisions).

Returning to FIG. 4 for illustration, in an embodiment, the adjustment signals 460 are transmitted at regular time intervals to the mirror assembly 430 from the control unit 450. The adjustment signals 460 can be determined by the control unit 450 based on event data 415 accumulated between adjustments.

FIG. 6 illustrates a method of initiation of tracking 600, according to embodiments described herein, which may be combined with other embodiments described herein, particularly those illustrated in any of the other accompanying figures. At least part of the method 600 may be performed by the control unit as described herein. The tracking system, which may include at least one tracking camera as described herein, can collect light from a region 610, such as by scanning. The collected region from which light is collected can optionally be a field of view, such as one taken by a conventional/frame camera. The scanning may be digital and/or mechanical (e.g. using the mirror assembly 130).

The control unit checks for the target object 620, such as a moving target object, illuminated target object, such as a ball, animal, and/or vehicle. An object for tracking can be recognized by the check for the target object 620. As illustrated in FIG. 6, if the check for the target 620 does not detect/recognize a tracking object, the scanning 610 can be repeated/continued. When a tracking object is detected (e.g. at step 620), object tracking 630 can start. For example, the control unit has an initiation mode in which the initiation of tracking 600 is performed, and a tracking mode, in which a method of tracking 400 is performed.

In an embodiment, initial bearing information can be estimated/determined based on user input. In another embodiment that can be combined with any other embodiment, the tracking system may include at least one conventional/frame camera, for example to aid in collecting light from the region (e.g. step 610) from which the tracking object can be recognized.

FIG. 7 illustrates a block diagram of a system, method, or device for tracking 400, according to embodiments described herein, combinable with other embodiments illustrated in any of the other accompanying figures. FIG. 7 is similar to FIG. 4. As in FIG. 4, the embodiment of FIG. 7 includes a tracked object 790, a mirror assembly 730, an event camera 710, and a control unit 750. The control unit 750 may be communicatively coupled to the mirror assembly 730 and event camera 710.

In the embodiment of FIG. 7, the tracked object 790 may be irradiated/illuminated by a light source 712 such as a laser. The light source 712 may be communicatively coupled to the control unit 750, which may control modulation of the light source. The light source may be directed by the mirror assembly 730, such as the same mirrors used to direct the light of the field of view into the event camera 710. Alternatively, the light source 712 may be directed at the tracking object 790 by a secondary system such as mirrors which are not part of the mechanism to direct light to the event camera 710, or a second mirror assembly (not shown). Irradiating the tracked object 790 may increase signal:noise and allow for more accurate tracking. Irradiating the tracked object 790 may allow tracking to occur in dark conditions. Alternatively/additionally, irradiating the tracked object 790 may allow the tracked object to be picked out from the environment more easily, particularly if the light source is intensity modulated so as to trigger the event camera 710.

Figure 8:
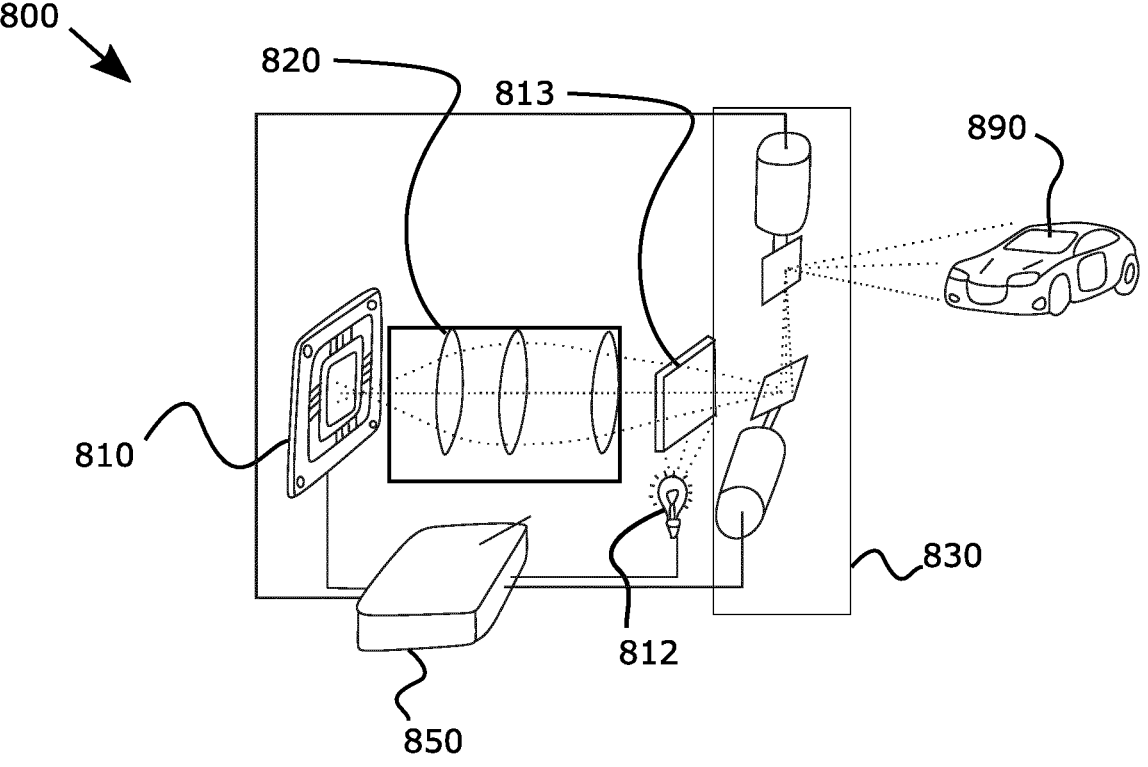
FIG. 8 illustrates a tracking camera, according to embodiments described herein.

FIG. 8 illustrates a tracking camera 800, according to embodiments described herein, including those illustrated in other figures. FIG. 8 shows a tracked object 890, mirror assembly 830, lens assembly 820, event camera 810, and a control unit 850. The tracking camera 800 illustrated in FIG. 8 also has a light source 812 which may be a laser, which can be used to irradiate/illuminate the tracked object 890. Beams from the light source 812 may be directed toward the tracked object 890 by a beam splitter 813 and/or the mirror assembly 830. The light source 812 may be communicatively coupled to the control unit. Irradiating the tracked object 890 may allow tracking to occur in dark conditions. Alternatively/additionally, irradiating the tracked object 890 may allow the tracked object to be picked out from the environment more easily, particularly if the light source is intensity modulated so as to trigger the event camera 810. An irradiated tracked object 890 may be recognized more easily and/or tracked more easily.

For example, the event camera 810 may register events arising from varying lighting conditions. A modulated light source 812 can generate varying lighting conditions to trigger events of the event camera 810. Alternatively/additionally, the intensity of the light source 812 reflected off the tracked object 890 may be significantly brighter than the environment. If any portion of the light from the light source 812 that misses the tracked object 890 and passes to the background, and is reflected to the event camera, that portion may be much less intense because the brightness will scale inversely with the distance squared. The intensity of points of the image that is focused onto the event camera 810 which come from further away can trigger fewer events than points closer to the event camera, such as those coming from the tracked object 890. An intensity modulated (e.g. flashing) light source can be used to irradiate the tracked object 890 and highlight it over the background/environment to facilitate the recognition/detection/tracking of the tracked object 890.

A tracking system may include at least one tracking camera, such as any combination of tracking cameras according to any embodiments described herein, such as those illustrated in other figures disclosed herein. Multiple tracking cameras, which may have different perspectives of a scene including the tracked object, may aid in determining the bearing array particularly 3D bearing information.

Figure 9:
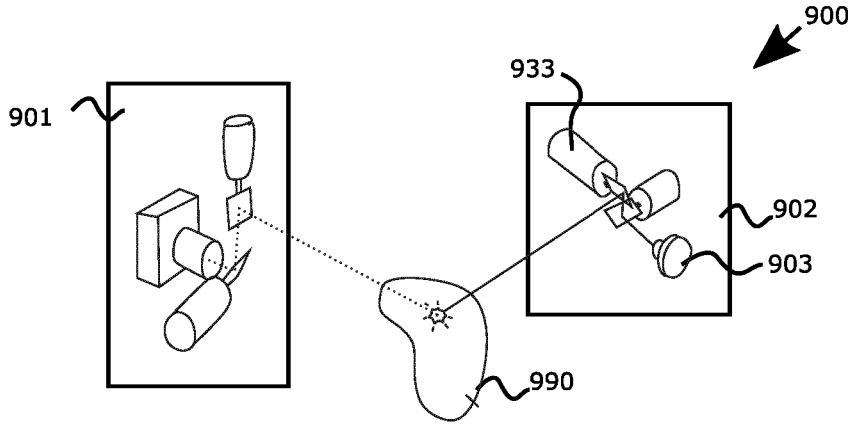
FIG. 9 illustrates a tracking system, according to embodiments described herein.

FIG. 9 illustrates a tracking system 900, according to embodiments described herein. The tracking system 900 can include at least one tracking camera 901, such as a tracking camera according to embodiments described herein, and an illumination assembly 902. The illumination assembly 902 may include a light source 903 such as a laser. The illumination assembly 902 may also include a mirror assembly 933 for directing the light source 903 toward a tracked object 990. The tracking system 900 is comparable to the tracking camera 800 of FIG. 8. In the tracking system 900, the illumination assembly 902 may allow tracking to occur in dark conditions. Alternatively/additionally, irradiating the tracked object 890 may allow the tracked object to be picked out from the environment more easily, particularly if the light source is intensity modulated so as to trigger the event camera of the tracking camera 901. An irradiated tracked object 990 may be recognized more easily and/or tracked more easily.

In an embodiment, a tracking system 900 may be such that the relative positions of the tracking camera(s) 901 and/or illumination assembly 902 are known. Furthermore, the tracking camera(s) 901 and/or illumination assembly 902 can be time-synchronized. The known positions and/or time synchronicity can be used to determine bearing information, such as the bearing array representative of the tracked object

990 and/or the absolute bearing of the tracked object 990 in a coordinate frame such as a coordinate frame that is common to each of the tracking camera(s) 901 and/or illumination assembly 902.

When the relative positions of the tracking camera(s) 901 and/or illumination assembly 902 are known, it can also be used to determine the position (e.g. position in a common coordinate frame and absolute position) of features of the field of view which are not part of the tracked object 990, e.g. static points, and points of the environment.

Figure 10:
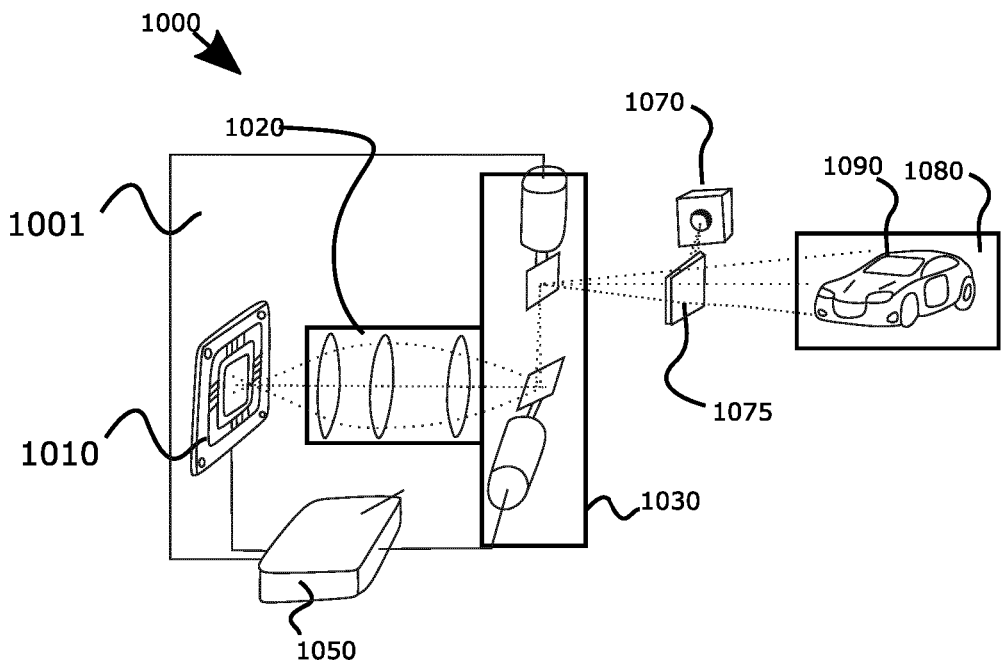
FIG. 10 illustrates a tracking system, according to embodiments described herein.

FIG. 10 illustrates a tracking system 1000, according to embodiments described herein. A tracking system 1000 may include at least one tracking camera 1001 according to embodiments described herein, such as those illustrated in other figures. The tracking camera 1001 of the tracking system 1000 may include an event camera 1010, a control unit 1050, a lens assembly 1020, and a mirror assembly 1030. As illustrated in FIG. 10, a beamsplitter 1075, shown to be in the optical path, e.g. intersecting the optical path between the tracking camera 1001 and the tracked object 1090, may allow the tracking camera 1001 and a second camera 1070, to collect light from the tracked object 1090 and/or a common field of view 1080. The beamsplitter 1075 may split the light from the tracked object 1090 such that the light goes to the tracking camera 1001 and the second camera 1070 simultaneously.

For example, the second camera 1070 can be a conventional/frame camera (such as a wide angle camera) which may facilitate object recognition by collecting light from a region, particularly a wide or variable region (see, for example, FIG. 6 particularly step 610 thereof). The second camera 1070 can be a tracking camera that includes an event camera, which may also be used to track the tracked object 1090. Use of a tracking camera 1001 in the tracking system 1000 may facilitate the determination of 3D bearing information of the tracked object 1090.

Figure 11:
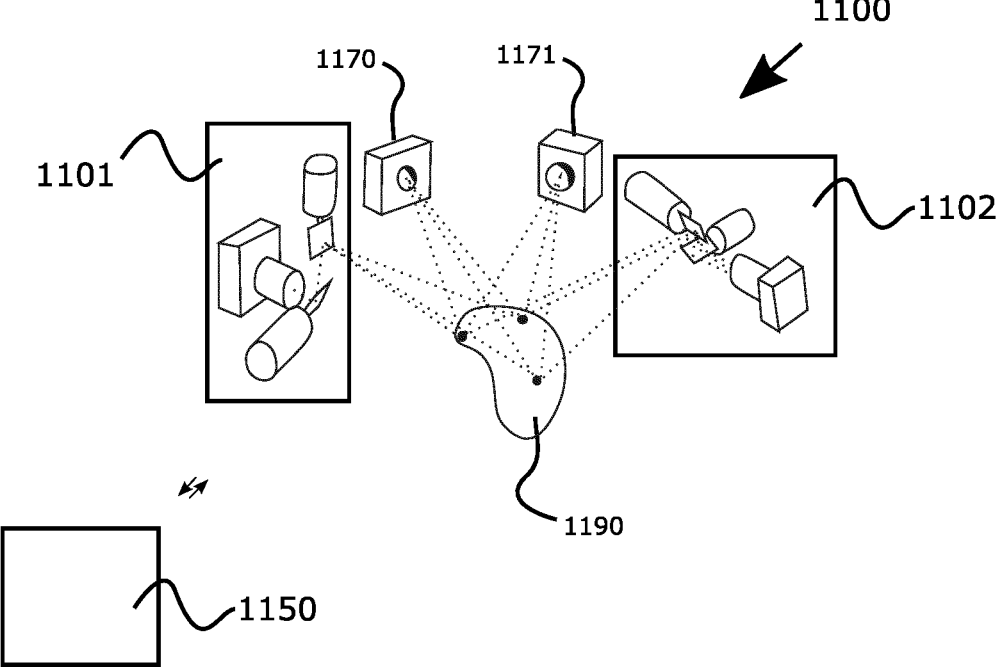
FIG. 11 illustrates a tracking system, according to embodiments described herein.

FIG. 11 illustrates a tracking system 1100, according to embodiments described herein. A tracking system 1100 may include at least one tracking camera 1101, 1102 that (each) includes an event camera. Alternatively/additionally, a tracking system 1100 may include at least one conventional/frame camera 1170, 1171, e.g. wide angle camera(s). The conventional/frame cameras 1170, 1170 may be positioned at known relative positions. They may also be synchronized. One or more, such as all of the cameras 1101, 1102, 1170, 1171 of the tracking system 1110 may be communicatively coupled to a control unit 1150. It is particularly contemplated to have at least one conventional/frame camera 1170, 1170 which has a wider field of view than the tracking camera(s) 1101, 1102. This may make it easier to recognize tracked objects 1190, such a during the initiation of tracking (see for example the description of FIG. 6). Multiple cameras may also help facilitate 3D tracking, particularly cameras with known relative positions and/or synchronizing capabilities. Synchronization of the cameras may, for example, be through the control unit 1150.

The conventional/frame camera(s) 1170, 1171 may also aid in estimation/determining changes in lighting conditions, which may trigger the event cameras. The control unit 1150 may process the image data from the conventional/frame camera(s) 1170, 1171 to compensate the effects of uneven lighting on the tracking of the tracked object 1190, such as trajectory estimation and/or bearing array (x, x', x", t) determination.

Herein, the tracking cameras and conventional/frame cameras may, in any embodiment, be used to generate images, such as images of the tracked object(s). For example, the event camera(s) output can be used for tracking and/or for generation of images of the objects, particularly with high temporal resolution. The images may be generated by intensity reconstruction. The images may have high dynamic range.

Figure 12:
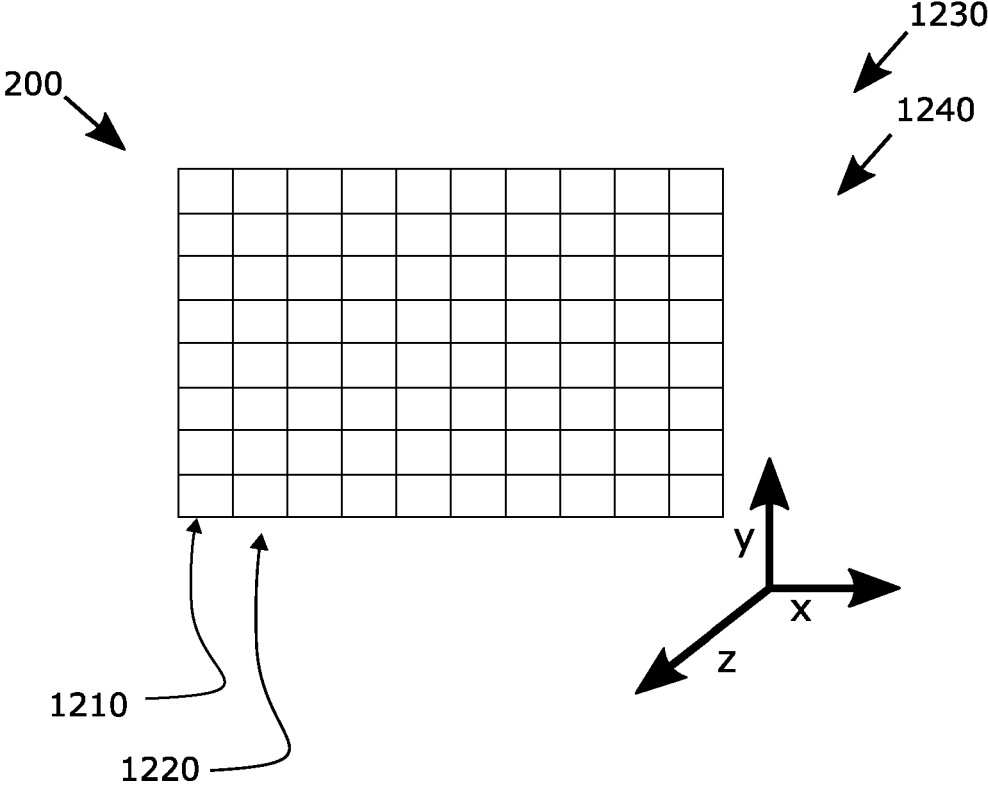
FIG. 12 illustrates a hybrid image sensor, according to embodiments described herein.

FIG. 12 illustrates a hybrid image sensor 1200 according to embodiments described herein. Any of the tracking cameras described herein may include a hybrid image sensor 1200, which includes an event camera 1230 and a conventional camera 1240. The hybrid image sensor 1200 may including conventional pixels 1210 for measuring light intensity for the conventional camera 1240, and event pixels 1220 sensitive to intensity changes. The event pixels 1220 may be configured for generating event data for transmission to the control unit. The conventional pixels 1210 may be configured for generating image data for transmitting an image frame to the control unit.

FIG. 12 illustrates a coordinate system, x, y, z, that can be associated with the bearing array and/or bearing information described herein, regardless of sensor type (event camera, frame camera, or hybrid). Coordinates x and y can correspond to rows and columns of the sensor 1200 and/or x and y directions of the field of view of the tracked object. Coordinate z can be perpendicular to the plane of the sensor 1200, e.g. connecting the camera sensor (such as the center thereof) to the tracked object and/or center of the field of view. The distance to the object may be measured along z. When the mirrors move, it is possible for the coordinates x, y, and/or z to move relative to another frame of reference.

Figure 13:
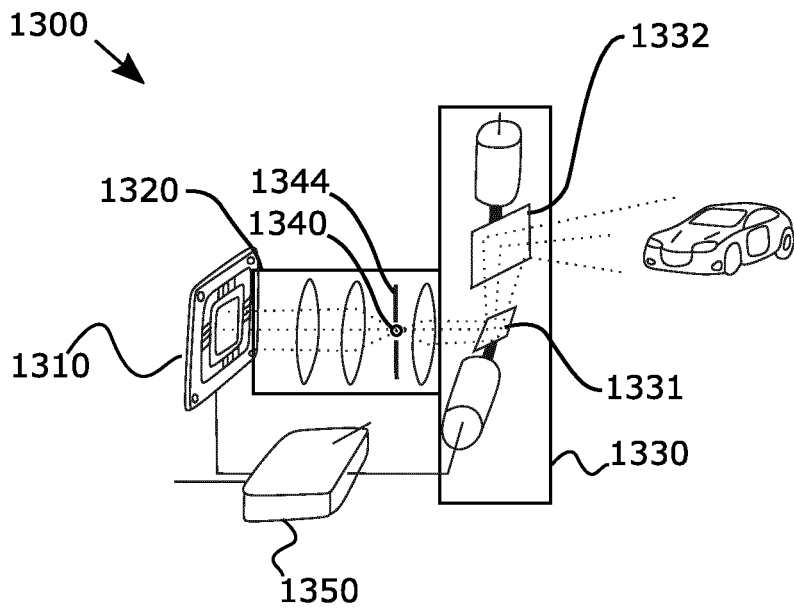
FIG. 13 illustrates a tracking camera, according to embodiments described herein.

FIG. 13 illustrates a tracking camera 1300 according to embodiments described herein, including those illustrated with other figures, particularly FIGS. 1-12. The tracking camera 1300 includes a mirror assembly 1330 and an event camera 1310, each communicatively coupled to a control unit 1350. FIG. 13 illustrates an embodiment in which the pupil position 1340 is within the lens assembly 1320. The light rays can converge at the pupil position 1340, which may be on the optical axis. An aperture 1344, e.g. an aperture stop, can be placed at the pupil position 1340, as illustrated in FIG. 13. In an embodiment, the mirror assembly 1330 comprises a smaller mirror 1331 nearer the pupil position 1340 and a larger mirror 1332 farther away from the pupil position 1340. The smaller mirror 1331 may be adjusted more rapidly than the larger mirror. The smaller mirror 1331 may have a 2-axis adjustment; the larger mirror 1332 may also have a 2-axis adjustment.

Figure 14:
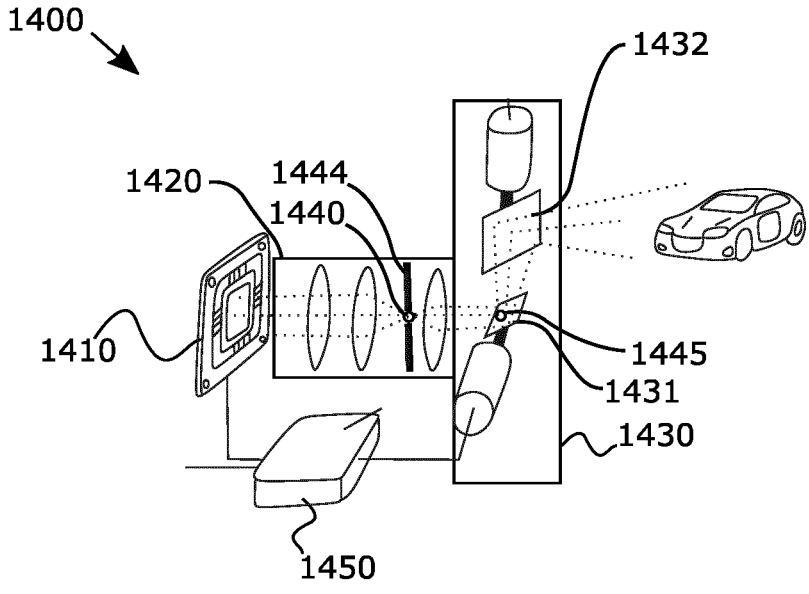
FIG. 14 illustrates a tracking camera, according to embodiments described herein.

FIG. 14 illustrates a tracking camera 1400 according to embodiments described herein, including those illustrated with other figures, particularly FIGS. 1-12. The tracking camera 1400 includes a mirror assembly 1430 and an event camera 1410, each communicatively coupled to a control unit 1450. FIG. 14 illustrates an embodiment in which a pupil position 1440 is within the lens assembly 1420. Alternatively/additionally, a pupil position 1445 can be within the mirror assembly 1430, such as at one of the mirrors 1431. Particularly at the first pupil position 1440, there may be an aperture 1444, e.g. an aperture stop.

The light rays can converge at any of the pupil position(s) 1440, 1445 which may be on the optical axis. An aperture 1444 can be placed at a pupil position 1440, as illustrated in FIG. 14. Alternatively/additionally, a mirror 1431, such as a baffled mirror, may be placed at a pupil position 1445. Baffles may aid in blocking scattered light from reaching the detector.

In an embodiment, the mirror assembly 1430 comprises a smaller mirror 1431 nearer the event camera 1410, and a larger mirror 1432 farther away from the event camera 1410.

The smaller mirror 1431 may be adjusted more rapidly than the larger mirror, such as due to smaller mass.

This may improve responsivity. At least one of the mirrors, particularly at least the smaller mirror 1431 may have a 2-axis adjustment. This may allow for rapid tracking in at least two dimensions.

Figure 15:
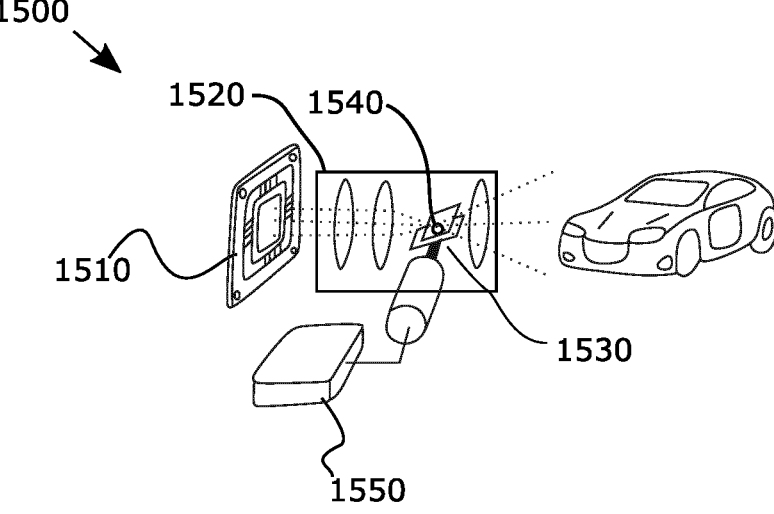
FIG. 15 illustrates a tracking camera, according to embodiments described herein.

FIG. 15 illustrates a tracking camera 1500 according to embodiments described herein, including those illustrated with other figures, particularly FIGS. 1-12. The tracking camera 1500 includes a mirror assembly 1530 and an event camera 1510, each communicatively coupled to a control unit 1550. FIG. 15 illustrates an embodiment in which a pupil position 1540 is within the lens assembly 1520 and the mirror assembly 1530. The pupil position 1540 can be within the mirror assembly 1530, such as at a mirror, particularly a baffled mirror. Baffles may aid in blocking scattered light from reaching the detector.

In an embodiment that can be combined with any other embodiment described herein, the light rays may converge at the pupil position 1540, which may be on the optical axis; alternatively/additionally, the mirror assembly 1530 has at least one mirror which is adjustable along at least 2 axes (e.g. axes along x and y). This may allow for rapid tracking in at least two dimensions.

Example

Note that the present technology can also be configured as described below.

(1) A tracking camera comprising:

a mirror assembly communicatively coupled to a control unit; and an event camera, communicatively coupled to the control unit;

wherein the control unit is configured to:

receive event data from the event camera, and adjust the mirror assembly based on the event data.

(2) The tracking camera of (1), further comprising:

a lens assembly which includes at least one lens between the mirror assembly and the event camera.

(3) The tracking camera of (1) or (2), wherein a pupil position of the lens assembly is:

within 2 cm, 1 cm, 5 mm, or 1 mm of the mirror assembly.

(4) The tracking camera of any one of (1) to (3), wherein the mirror assembly comprises an adjustable mirror configured for adjustment based on an adjustment signal from the control unit.

(5) The tracking camera of any one of (1) to (4), wherein an actuatable mirror of the mirror assembly is a galvanometer mirror, a MEM mirror, or a PZ mirror.

(6) The tracking camera of any one of (1) to (5), further comprising an orientation feedback system communicatively coupled to the control unit for communicating a mirror assembly status.

(7) The tracking camera of any one of (4) to (6), wherein the control unit is configured to:

determine the adjustment signal based on the event data, and transmit the adjustment signal to the mirror assembly for adjusting the mirror assembly.

(8) The tracking camera of (7), wherein the control unit is configured to:

receive event data for a time interval, and estimate a bearing array corresponding to a tracked object based on the event data; wherein the adjustment signal is based on the bearing array.

(9) The tracking camera of (8), wherein the control unit is configured to:

transmit the adjustment signal such that an optical axis of the tracking camera which extends out of the tracking camera is moved to a target direction based on the bearing array.

(10) The tracking camera of any one of (1) to (9), further comprising:

a hybrid image sensor which includes the event camera and a conventional camera, the hybrid image sensor including conventional pixels for measuring light intensity for the conventional camera, and event pixels sensitive to intensity changes, the event pixels configured for generating event data for transmission to the control unit.

(11) A tracking system comprising:

a tracking camera according to any one of (1) to (10), and a conventional camera, and a beamsplitter configured to split light from a field of view to each of the conventional camera and the event camera.

(12) A tracking system comprising:

a tracking camera according to any one of (1) to (10), and a plurality of conventional cameras, each configured to be communicatively coupled to the controller and synchronized.

(13) A tracking system comprising a plurality of tracking cameras, each tracking camera as defined in any one of (1) to (10).

(14) A tracking system comprising a tracking camera according to any one of (1) to (10), and a light source such as a laser, the light source configured to irradiate a portion of a field of view of the tracking camera such as an object for tracking therein.

(15) The tracking system of (14), further comprising:

a beamsplitter intersecting the optical axis of the tracking camera and configured to direct light from the light source out of the tracking camera, such as extending from the beamsplitter through the mirror assembly and along an externally located part of the optical axis.

(16) A method of operating a tracking camera, comprising:

receiving event data from an event camera;

determining an adjustment signal based on the event data;

transmitting the adjustment signal to a mirror assembly;

adjusting the mirror assembly according to the adjustment signal.

(17) The method of operating of (16), further comprising:

collecting light from a pupil position which is within 2 cm of the mirror assembly, forming an image of a tracked object on the event camera.

(18) The method of operating a tracking camera of any one of (16) or (17), further comprising:

estimating a bearing array based on the event data, the bearing array corresponding to a tracked object, wherein determining the adjustment signal is based on the bearing array.

(19) The method of operating a tracking camera of (18), further comprising:

accumulating the event data for a time interval;

determining a common time within the time interval; wherein the bearing array includes an element at the common time based on the accumulated event data.

(20) A non-transitory computer-readable medium computer program having a program code for, when executed on a processor, causing the execution of the method according to any one of (16) to (19).

The aspects and features mentioned and described together with one or more of the previously detailed examples and figures, may as well be combined with one or more of the other examples in order to replace a like feature of the other example or in order to additionally introduce the feature to the other example.

Herein, a flow chart, a flow diagram, a state transition diagram, a pseudo code, and the like may represent various processes, operations or steps, which may, for instance, be substantially represented in transitory and/or non-transitory machine readable medium (e.g. a floppy disc, a DVD, a Blu-Ray, a CD, a ROM, a PROM, and EPROM, an EEPROM or a FLASH memory) and executable by a processor or a programmable hardware, whether or not such processor or a programmable hardware is explicitly shown. Methods disclosed in the specification or in the claims may be implemented by a device having means for performing each of the respective acts of these methods.

A non-transitory computer-readable medium computer program may have a program code for, when executed on a processor, causing the execution of any of the methods described herein.

It is to be understood that the disclosure of multiple acts, processes, operations, steps or functions disclosed in the specification or claims are not to be construed to be limited in a specific order, unless explicitly or implicitly described otherwise. In some examples a described act, function, process, operation, or step may include or may be broken into multiple subordinate acts, functions, processes, operations and/or steps.

Reference numerals are given to aid in understanding and are not intended to be limiting.

It will be understood that when a feature is referred to as being "connected" or "coupled" to another element, the features may be directly connected, or coupled via one or more intervening elements.

Herein "event camera" may refer to a sensor that responds to local changes in brightness, such as an imaging sensor, an optoelectronic circuit for determining and/or transmitting event signals, and/or the photoreactive area thereof. Herein, "responsivity" may be used to indicate response time, for example. An improvement in responsivity may be interpreted to mean a faster response time, and vice versa. Herein, the term "irradiate" may be used interchangeably with "illuminate." Herein, "actuatable" and "adjustable" may be used interchangeably; for example an adjustable mirror may be an actuatable mirror. Herein "control unit" may be, for example, at least one processor such as a computer processor, computing device (such as a programmable electronic device), or the like, including possibly a network of computing devices. "Controller" and "control unit" may be used interchangeably. Herein, "bearing array" may be a single element array, a two element array, or greater; for example, the bearing array may be x and y coordinates corresponding to the position of the tracked object in the image plane formed by the lens assembly.

Herein, "conventional camera" may be used interchangeably with "frame camera." A conventional camera may be a high-speed camera. Herein a conventional camera is differentiated from an event camera. Herein, "tracked object" and "target object" may be used interchangeably.

Herein, coordinates x, y, z, such as those used in the bearing information and/or bearing array, may be in the frame of reference of the camera, such as the event camera thereof. Coordinates x and y may be associated with the x, y dimensions of the camera and/or camera sensor (e.g. the event camera). The z direction may be associated with the distance from the front of the camera, e.g. the tracking camera, and may be associated with the part of the optical axis that extends out from the tracking camera. It is possible that, in another coordinate frame, e.g. an "absolute" coordinate frame, e.g. a coordinate frame of the user/observer or a second camera, the coordinate(s) change(s) direction. For example, the z direction may change in response to changes in the mirror orientations of the tracking camera.

Herein an "aperture" may be an opening, hole, diaphragm, field stop, aperture stop, spatial filter, pupil, or the like. An aperture and/or pupil may block some light rays and allow others to pass. An aperture and/or pupil may limit light passing along/near the optical axis. For example, an aperture and/or pupil on the optical axis of the tracking camera, such as within the lens assembly and/or mirror assembly, may allow light rays near the optical axis to pass and block rays that are farther away from the optical axis (e.g. farther off-axis). Herein a "pupil position" may be a position where an aperture is placed, such as a lens aperture stop. A pupil position may be where light rays converge on the optical axis. A pupil position may be at a position of an intermediate image within the tracking camera. Herein, pupil position and pupil point may be used interchangeably.

Herein, a trailing "(s)" or "(es)" indicates an optional plurality. Thus, for example, "mirror(s)" means "one or more mirrors," "at least one mirror," or "a mirror and optionally more mirrors." Herein a slash "/" indicates "and/or" which conveys "'and' or 'or'". Thus "A/B" means "A and/or B;" equivalently, "A/B" means "at least one of A and B."

The description and drawings are for illustration. The description is to aid the reader's understanding of the subject matter defined in the appended claims.

What is claimed is:

1. A tracking camera comprising:
a mirror assembly communicatively coupled to a control unit; and
an event camera communicatively coupled to the control unit, wherein
the mirror assembly is configured to direct light from a tracked object to the event camera, and
the control unit is configured to:
receive event data from the event camera, and
adjust the mirror assembly based on the event data such that the tracked object is kept within a line of sight of the event camera.

2. The tracking camera of claim 1, further comprising:
a lens assembly which includes at least one lens between the mirror assembly and the event camera.

3. The tracking camera of claim 2, wherein a pupil position of the lens assembly is within 2 cm of the mirror assembly.

4. The tracking camera of any one of claims 1 to 3, wherein the mirror assembly includes an actuatable mirror configured for adjustment based on an adjustment signal from the control unit.

5. The tracking camera of claim 4, wherein the actuatable mirror of the mirror assembly is a galvanometer mirror, a microelectromechanical mirror, or a piezoelectric mirror.

6. The tracking camera of claim 1, further comprising: an orientation feedback system communicatively coupled to the control unit for communicating a mirror assembly status.

7. The tracking camera of claim 4, wherein the control unit is configured to: determine the adjustment signal based on the event data, and transmit the adjustment signal to the mirror assembly for adjusting the mirror assembly.

8. The tracking camera of claim 7, wherein
the control unit is configured to:
receive the event data for a time interval, and
estimate a bearing array corresponding to the tracked object based on the event data, and
the adjustment signal is based on the bearing array.

9. The tracking camera of claim 8, wherein the control unit is configured to:
transmit the adjustment signal such that an optical axis of the tracking camera which extends out of the tracking camera is moved to a target direction based on the bearing array.

10. A method of operating a tracking camera, comprising:
directing, by a mirror assembly of the tracking camera, light from a tracked object to an event camera of the tracking camera;
receiving event data from the event camera;
determining an adjustment signal based on the event data;
transmitting the adjustment signal to the mirror assembly;
adjusting the mirror assembly according to the adjustment signal such that the tracked object is kept within a line of sight of the event camera.

11. The method of operating the tracking camera of claim 10,
wherein the tracking camera includes a lens assembly which includes at least one lens between the mirror assembly and the event camera, and
wherein the method further comprises:
collecting light from a pupil position of the lens assembly, which is within 2 cm of the mirror assembly, and
forming an image of the tracked object on the event camera.

12. The method of operating the tracking camera of claim 10 or claim 11, further comprising:
estimating a bearing array based on the event data, the bearing array corresponding to the tracked object,
wherein determining the adjustment signal is based on the bearing array.

13. The method of operating the tracking camera of claim 12, further comprising:
accumulating the event data for a time interval; and
determining a common time for events accumulated within the time interval,
wherein the bearing array includes an element at the common time based on the accumulated event data.

14. The tracking camera of claim 1, wherein the control unit is configured to:
estimate a bearing array based on the event data, and
adjust the mirror assembly based on the bearing array.

15. The tracking camera of claim 1, wherein
the event data includes asynchronous event data, and
the control unit is configured to adjust the mirror assembly based upon the event data including the asynchronous event data such that the tracked object is kept within the line of sight of the event camera.

16. The tracking camera of claim 1, wherein the event data includes a pixel position and a polarity, and the control unit is configured to adjust the mirror assembly based upon the event data including the pixel position and the polarity such that the tracked object is kept within the line of sight of the event camera.

17. The tracking camera of claim 1, wherein the event data includes a time stamp, and the control unit is configured to adjust the mirror assembly based upon the event data including the time stamp such that the tracked object is kept within the line of sight of the event camera.

18. The tracking camera of claim 1, wherein the event data includes a pixel x-position, a pixel y-position, a polarity, and a time stamp, and the control unit is configured to adjust the mirror assembly based upon the event data including the pixel x-position, the pixel y-position, the polarity, and the time stamp such that the tracked object is kept within the line of sight of the event camera.

19. The tracking camera of claim 1, wherein the event data includes a polarity, and the control unit is configured to adjust the mirror assembly based upon the event data including the polarity such that the tracked object is kept within the line of sight of the event camera.

20. A non-transitory computer-readable medium storing a computer program having a program code for, when executed on a processor, causing the execution of the method according to claim 10.

* * * * *